United States Patent [19]

Izumi et al.

[11] Patent Number: 5,181,491
[45] Date of Patent: Jan. 26, 1993

[54] INTAKE SYSTEM IN MULTI-CYLINDER TYPE INTERNAL COMBUSTION ENGINE

[75] Inventors: Masahiro Izumi; Toshiharu Aoshima; Yutaka Ide; Ritsuko Terawaki; Hideaki Hosoya, all of Saitama, Japan

[73] Assignee: Honda Giken Kogyo Kabushiki Kaisha, Tokyo, Japan

[21] Appl. No.: 842,703

[22] Filed: Feb. 27, 1992

[30] Foreign Application Priority Data

Mar. 1, 1991 [JP] Japan .................................. 3-036100

[51] Int. Cl.⁵ .......................... F02D 9/00; F02B 75/18
[52] U.S. Cl. .................................. 123/336; 123/52 M
[58] Field of Search ............... 123/336, 52 M, 52 MC, 123/73 A, 432

[56] References Cited

U.S. PATENT DOCUMENTS

| 4,846,996 | 9/1989 | Hoover ........................... 123/336 |
| 4,924,834 | 5/1990 | Bonfiglioli et al. ............. 123/52 M |
| 5,036,816 | 8/1991 | Mann ............................. 123/336 |

Primary Examiner—Raymond A. Nelli
Attorney, Agent, or Firm—Armstrong, Westerman, Hattori, McLeland & Naughton

[57] ABSTRACT

An intake system in a multi-cylinder type internal combustion engine comprises throttle valves disposed in a plurality of intake passages commonly connected to an air cleaner, and fuel injection valves disposed in the intake passages downstream of the throttle valves in an intake direction. In such intake system, a plurality of funnel-shaped portions are provided in a throttle body having opposite ends directly coupled to an intake manifold and an air cleaner, respectively, and each of the throttle valves is disposed in the throttle body, so that its upstream end in the intake direction is located at least on the corresponding funnel-shaped portion, when the throttle valve is fully opened. The throttle body includes ports provided therein, which are opened into the intake passages between a coupled surface of the throttle body to the intake manifold and the throttle valves, respectively, and which communicate with one another. This provides an increase in space efficiency and an increase in intake inertial effect.

12 Claims, 5 Drawing Sheets

INTAKE SYSTEM IN MULTI-CYLINDER TYPE INTERNAL COMBUSTION ENGINE

BACKGROUND OF THE INVENTION

1. Field of the Invention

This invention relates to intake systems in multi-cylinder type internal combustion engines of a type comprising a plurality of intake passages independently leading to cylinders in an engine body and commonly connected to an air cleaner, throttle valves independently disposed in the intake passages, and fuel injection valves also independently disposed in the intake passages at positions downstream of the throttle valves in an intake direction in correspondence to the cylinders.

2. Description of the Prior Art

Such an intake system is already known, for example, from Japanese Utility Model Publication No. 36677/84 or the like.

In the above prior art intake system, however, a plurality of intake passages are commonly connected to a surge tank which is, in turn, connected to an air cleaner. Hence, such system is not space efficiency. Each of the throttle valves is disposed in a substantially central portion of corresponding one of the intake passages, and the length of the intake passage extending downstream of each throttle valve is relatively short, resulting in a reduced intake inertial effect. Moreover, the intake passages communicate with one another through openings provided in a throttle body at a position downstream of the throttle valves. Hence, the intake inertial effect is reduced by such openings.

SUMMARY OF THE INVENTION

Accordingly, it is an object of the present invention to provide an intake system in a multi-cylinder type internal combustion engine, wherein increases in space efficiency and in intake inertial effect are provided.

To achieve the above object, according to a first aspect and feature of the present invention, there is provided an intake system in a multi-cylinder type internal combustion engine, comprising a plurality of intake passages independently leading to cylinders in an engine body and commonly connected to an air cleaner, throttle valves independently disposed in the intake passages, and fuel injection valves also independently disposed in the intake passages at positions downstream of the throttle valves in an intake direction corresponding to the cylinders, wherein each of the intake passages comprises an intake manifold connected to the engine body and a throttle body having opposite ends directly connected to the intake manifold and the air cleaner, respectively. The throttle body includes a plurality of funnel-shaped portions provided therein and spread toward an upstream side to define upstream ends of the intake passages. Each of the throttle valves is disposed in a throttle body, so that an upstream end of the throttle valve in the intake direction is located at least on the corresponding funnel-shaped portion when the throttle valve is fully opened. The throttle body is provided with ports which are opened into the intake passages between a coupled surface of the throttle body to the intake manifold and the throttle valves, respectively, and which communicate with one another.

With the above first feature of the present invention, the intake passages are constructed such that the opposite ends of the throttle body are directly connected to the intake manifold connected to the engine body and the air cleaner, respectively.

Therefore, it is possible to allow the air cleaner to function as a surge tank, thereby providing an increased space efficiency and ensuring that the throttle valves can be disposed as upstream as possible in the intake passages. This contributes to an increase in output from the engine in cooperation with the fact that the upstream ends of the throttle valves are located at least on the corresponding funnel-shaped portions when the throttle valves are fully opened. In addition, by the fact that the ports communicating with one another are opened into the intake passages between the coupled surface of the throttle body to the intake manifold and the throttle valves, such ports are disposed in upstream portions of the intake passages, thereby making it possible to avoid reduction in intake inertial effect.

In addition, according to a second aspect and feature of the present invention, there is provided an intake system in a multi-cylinder type internal combustion engine, comprising a plurality of intake passages independently leading to cylinders in an engine body and commonly connected to an air cleaner, throttle valves independently disposed in the intake passages, and fuel injection valves also independently disposed in the intake passages at positions downstream of the throttle valves in an intake direction in correspondence to the cylinders, wherein each of the intake passages comprises an intake manifold connected to the engine body and a throttle body having opposite ends directly connected to the intake manifold and the air cleaner The throttle body includes constrictions provided therein and opened into the intake passages between a coupled surface of the throttle body to the intake manifold and the throttle valves, respectively, the constrictions being commonly connected to an intake pressure detector:

With the above second feature of the present invention, the intake passages are constructed such that the opposite ends of the throttle body are directly connected to the intake manifold connected to the engine body and the air cleaner, respectively. Therefore, it is possible to allow the air cleaner to perform a function as a surge tank, thereby providing an increased space efficiency and ensuring that the throttle valves can be disposed as upstream as possible in the intake passages In addition, as a result of the constrictions being opened into the intake passages between a coupled surface of the throttle body to the intake manifold and the throttle valves, respectively, and being commonly connected to an intake pressure detector, they are disposed in upstream portions of the intake passages, ensuring that it is possible to avoid a reduction in intake inertial effect and to avoid that the intake passages exert an influence to each other, leading to an increased accuracy of detection of an intake pressure Further, according to a third aspect and feature of the present invention, there is provided an intake system in a multi-cylinder type internal combustion engine, comprising a plurality of intake passages independently leading to cylinders in an engine body and commonly connected to an air cleaner, throttle valves independently disposed in the intake passages, and fuel injection valves also independently disposed in the intake passages at positions downstream of the throttle valves in an intake direction in correspondence to the cylinders, wherein each of the intake passages comprises an intake manifold connected to the engine body and a throttle body having opposite ends directly connected to the intake manifold and the air cleaner. The throttle body includes first and second ports provided therein and opposed to each other in a plane in the intake direction, including rotational axes of the throttle valves, so that they are opened into the intake passages between a coupled surface of the throttle body to the intake manifold and the throttle valves. The intake system further includes a first communication passage commonly communicating with the first ports, and a second communication passage commonly communicating with the second port, the first and second communication passages being disposed above the first and second ports, respectively.

With the above third feature of the present invention, the intake passages are constructed such that the opposite ends of the throttle body are directly connected to the intake manifold connected to the engine body and the air cleaner, respectively. Therefore, it is possible to allow the air cleaner to perform a function as a surge tank, thereby providing an increased space efficiency and ensuring that the throttle valves can be disposed as upstream as possible in the intake passages, thereby providing an increased output from the engine. In addition, since the first and second ports opposed to each other in the plane in the intake direction, including the rotational axes of the throttle valves, are provided in the throttle body, so that they are opened into the intake passages between the coupled surface of the throttle body to the intake manifold and the throttle valves, the first ports being commonly connected to the first communication passage, and the second ports being commonly connected to the second communication passage, it is possible to avoid such ports exert an influence to each other and reduction in intake inertial effect and to ensure that both the ports are difficult to be subjected to an influence on both the communication passages, due to a variation in opening degree of the throttle valves. Because the first and second communication passages are disposed above the first and second ports, it is possible to prevent water or oil from being accumulated in the communication passages.

The above and other objects, features and advantages will become apparent from a consideration of the following description of the preferred embodiments, taken in conjunction with the accompanying drawings.

BRIEF DESCRIPTION OF THE DRAWINGS

FIGS. 1 to 5 illustrate a preferred embodiment of the present invention, wherein FIG. 1 is a side view of a three-cylinder type internal combustion engine;

FIG. 2 is a plan view taken along an arrow 2 in FIG. 1;

FIG. 3 is an enlarged sectional view taken along a line 3—3 in FIG. 2;

FIG. 4 is an enlarged sectional view taken along a line 4—4 in FIG. 1; and

FIG. 5 is a sectional view taken along a line 5—5 in FIG. 3.

DESCRIPTION OF THE PREFERRED EMBODIMENTS

The present invention is described by way of a preferred embodiment applied to an intake system in a three-cylinder type internal combustion engine.

Figure 1:
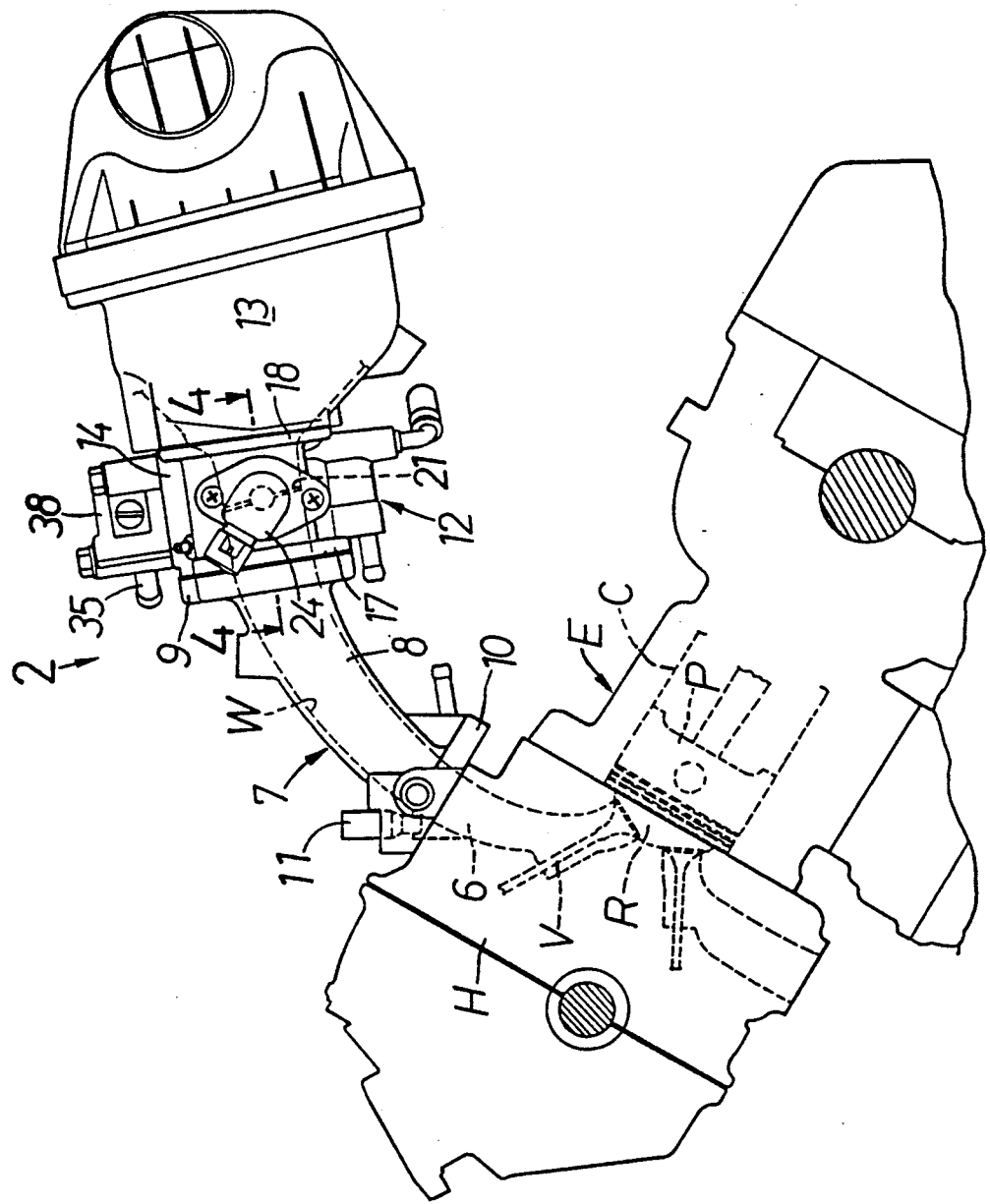
Figure 2:
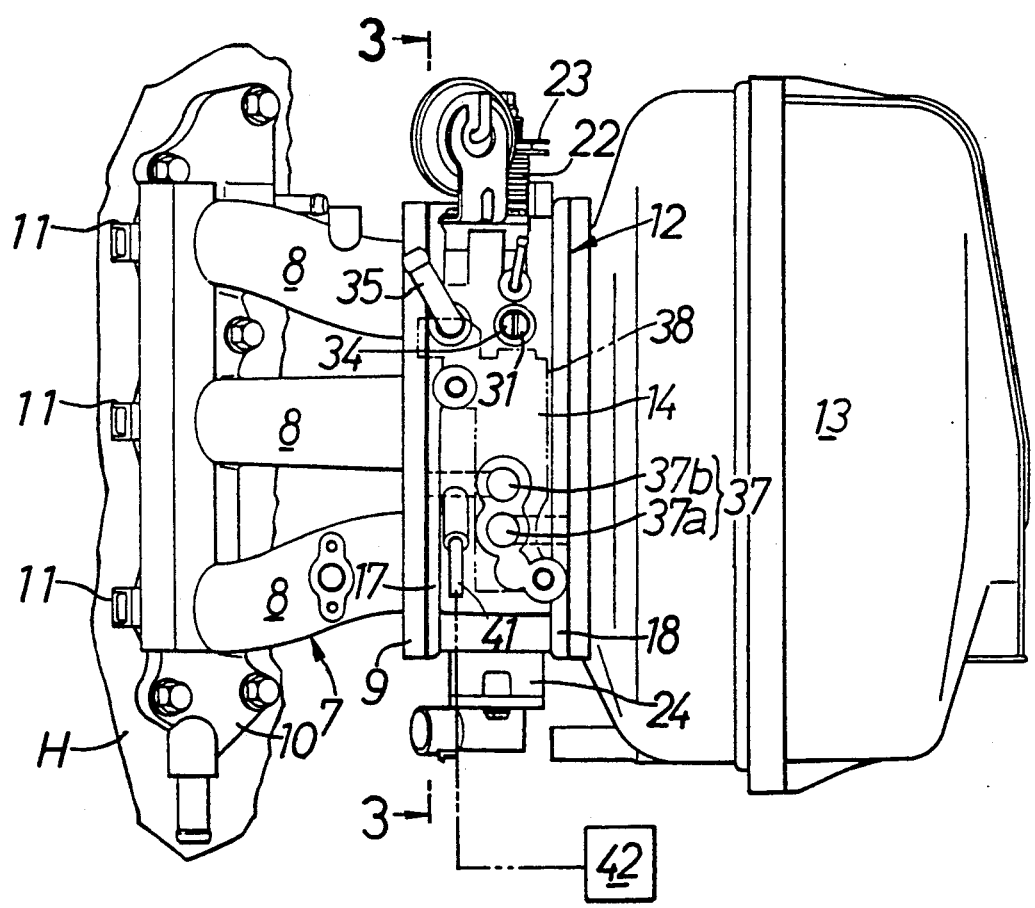

Referring first to FIGS. 1 and 2, an engine body E of the three-cylinder type internal combustion engine is disposed, such that axes of three cylinders C arranged side by side are inclined in one direction from a vertical direction. A combustion chamber R is defined between an upper surface of a piston P reciprocal in each of the cylinders C and a cylinder head H in the engine body E. An intake manifold 7 is connected to each of tree intake ports 6 provided in the cylinder head H and each connected to corresponding one of the combustion chambers R through an intake valve V. More specifically, the intake manifold 7 comprises three intake pipes 8, FIG. 2, corresponding to the cylinders C of the engine body E, respectively, a flange 9 which commonly connects upstream ends of the intake pipes 8, and a flange 10 which commonly connects downstream ends of the intake pipes 8. The flange 10 is coupled to a side surface of the cylinder head H in such a manner that each of the intake pipes 8 is in communication with a corresponding one of the intake ports 6. Moreover, flange 10 has three fuel injection valves mounted thereto for injecting a fuel toward the respective intake ports 6.

A downstream end of a throttle body 12, FIG. 1, is coupled to flange 9 of the intake manifold 7, and an air cleaner 13 is coupled to an upstream end of the throttle body 12. Three intake passages W are provided to independently lead to each of the cylinders C in the engine body E, respectively, and to extend from the throttle body 12 through the intake manifold 7 to the intake ports 6, respectively. A throttle valve 21 is disposed in each of the intake passages W, and a fuel injection valves 11 is disposed in each cylinder C downstream of the throttle valve 21. The intake manifold 7, the throttle body 12 and the air cleaner 13 are disposed above a side surface of the inclined engine body E.

Figure 3:
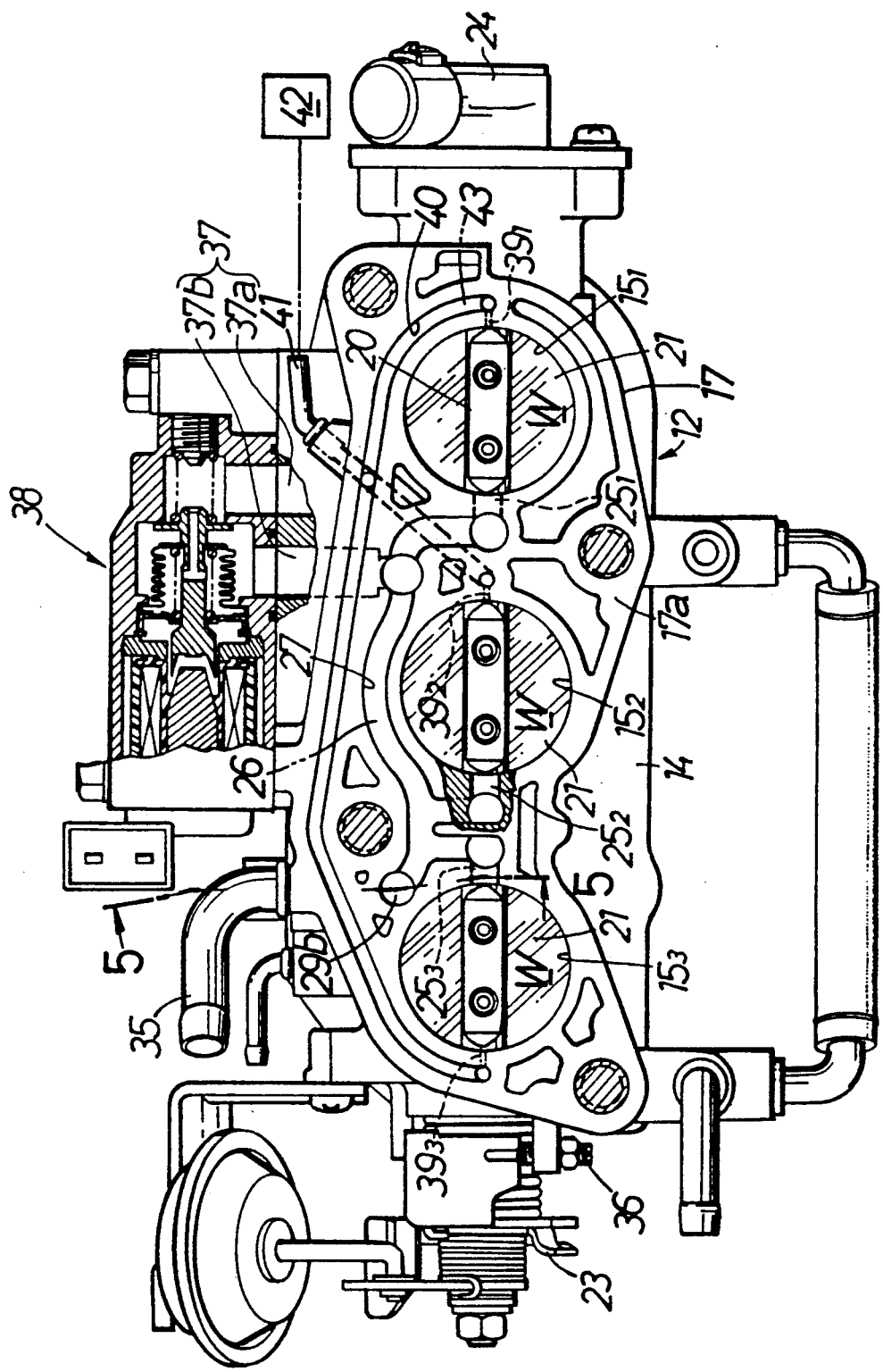
Figure 4:
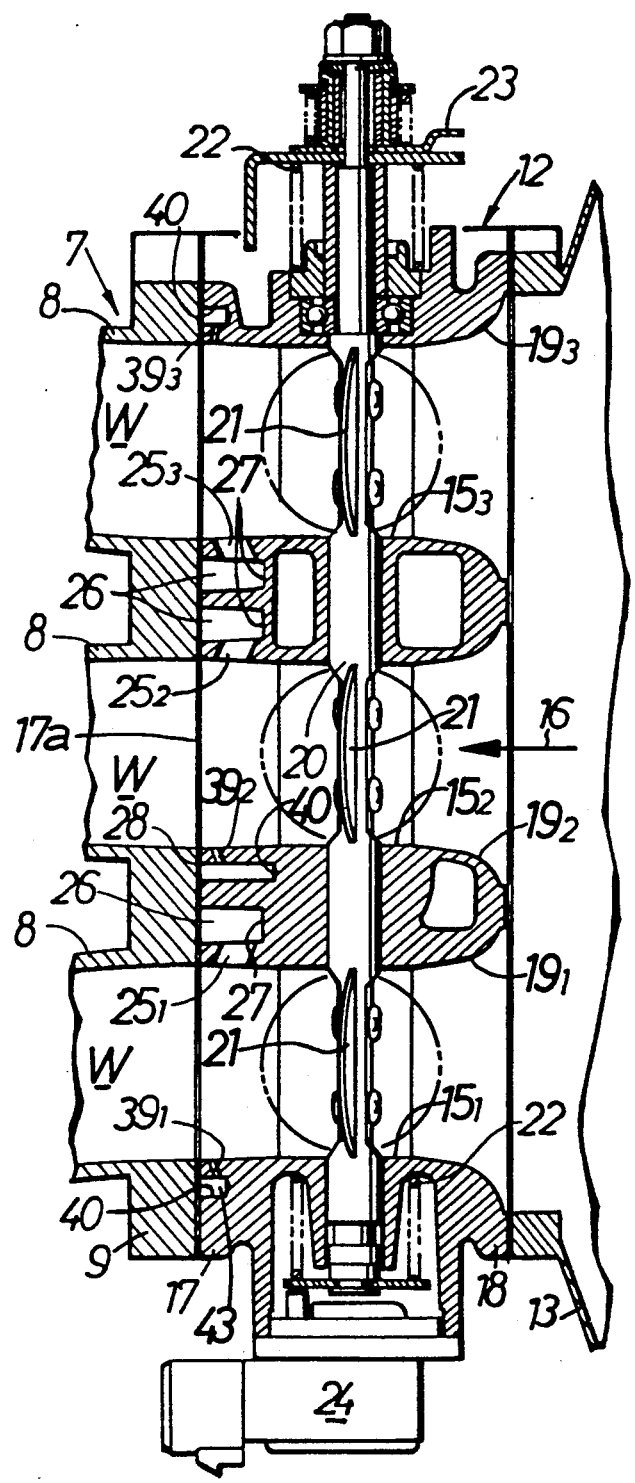

Referring to FIGS. 3 and 4, three intake paths $15_1$, $15_2$ and $15_3$ are provided in parallel in a body portion 14 of the throttle body 12 to form upstream portions of the three intake passages W leading to the corresponding cylinders C in the engine body E. The body portion 14 is provided with a flange portion 17 coupled to the flange 9, FIG. to permit an independent communication of downstream ends of the intake paths $15_1$, $15_2$ and $15_3$ in an intake direction 16 with the respective intake pipes 8, FIGS. 1 and 2, of the intake manifold 7, and a flanged portion 18 coupled to the air cleaner 13 to permit a common communication of upstream ends of the intake paths $15_1$, $15_2$ and $15_3$ in the intake direction 16 with the air cleaner 13.

A single valve stem 20, FIG. 4, is rotatably carried in the body portion 14 to pass through the intake paths $15_1$, $15_2$ and $15_3$, and three butterfly type throttle valves 21 are secured to the valve stem 20 for controlling flow areas of the intake paths $15_1$, $15_2$ and $15_3$, respectively. The valve stem 20 is biased for rotation in a direction to close the throttle valves 21 by a spring force of a pair of return springs 22, 22 interposed between the valve stem 20 and the body portion 14 adjacent opposite ends of stem 20. A throttle drum 23 is connected to a throttle operating means (not shown) and to one end of the valve stem 20 protruding from the body portion 14. An opening degree detector 24, for detecting the throttle opening degree, is connected to the other end of the valve stem 20 protruding from the body portion 14. Further, the body portion 14 has an idle stop screw 36, FIG. 3, threadedly fitted therein for defining an idle opening degree position of throttle valves 21, so that the idle stop screw can be advanced and retreated to adjust the idle opening degree position The body portion 14 of the throttle body 12 has funnel-shaped portions $19_1$, $19_2$ and $19_3$ provided therein at the upstream ends of the intake passages W, i.e., at the upstream ends of the intake paths $15_1$, $15_2$ and $15_3$ and formed so as to spread toward the upstream side in the intake direction 16, i.e., toward the air cleaner 13. The throttle valves 21 are secured to the valve stem 20, so that their upstream ends, in the intake direction 16, are positioned at least on the funnel-shaped portions $19_1$, $19_2$ and $19_3$ in their fully-opened states (states shown by dashed lines in FIG. 4).

Figure 5:
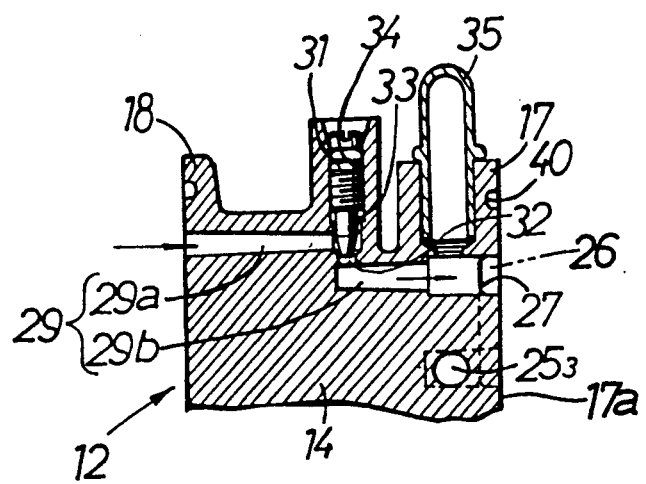

A first groove 27, FIG. 5, is provided in a coupled surface 17a of the flange portion 17 of the body portion 14 to the manifold 7. Moreover, the flange portion 17 and the flange 9 of the intake manifold 7 are coupled to each other with a gasket 28 interposed therebetween. When the throttle body 12 and the intake manifold 7 are coupled to each other, an opening of the first groove 27 adjacent the intake manifold 7 is occluded by the gasket 28, and a first communication passage 26 is defined by the gasket 28 and the first groove 27.

On the other hand, at locations closer to coupled surfaces 21a between the coupled surface 17a of the flange portion 17 and the throttle valves 21, first ports $25_1$, $25_2$ and $25_3$, FIGS. 3 and 4, having axes angularly toward an axis of the valve stem 20, are provided in the body portion 14 and opened into the intake paths $15_1$, $15_2$ and $15_3$. The first ports $25_1$, $25_2$ and $25_3$ are commonly connected to the first communication passage 26 and thus the first groove 27. Moreover, as shown in FIG. 3, the first groove 27 is defined in the coupled surface 17a with its portions communicating with the first ports $25_1$, $25_2$ and $25_3$ being at lowermost positions.

Referring to FIG. 5, the body portion 14 is provided with a first air supply passage 29 which is communicated at one end to the air cleaner 13 and at the other end to the first communication passage 26 and thus to the first groove 27. An adjusting screw 31 is provided in the middle of the first air supply passage 29.

The first air supply passage 29 is comprised of an upstream portion 29a provided in the vicinity of the intake path $15_3$ to extend in the intake direction 16 and opened into an end face of the body portion 14 adjacent the air cleaner 13, and a downstream portion 29b disposed at a location separated from the upstream portion 29a to communicate with the first groove 17. The adjusting screw 31 is advancably and retractably, threadedly fitted in the body portion 14 to adjust the amount of air flowing from the upstream portion 29a to the downstream portion 29b. More specifically, the body portion 14 is provided with a valve bore 32 perpendicularly leading to an upstream end of the downstream portion 29b, a bore 33 coaxially connected to the valve bore 32 with a downstream end of the upstream portion 29a opened into a side of the bore 33, and a threaded bore 34 coaxially leading to the bore 33 and opened into a side surface of the body portion 14. The adjusting screw 31 is threadedly received in the threaded bore 34 to adjust the opened area of the valve bore 33.

A connecting pipe 35 is connected to the body portion 14 to lead to the downstream portion 29b of the first air supply passage 29. The connecting pipe 35 is connected to a vacuum operating device which is not shown.

As also shown in FIG. 3, a second air supply passage 37 is provided in the body portion 14 and communicated at one end to the air cleaner 13 and at the other end to the first communication passage 26 and thus the first groove 27. An idle adjusting valve 38 is provided in the middle of the second air supply passage 37.

The second air supply passage 37 is comprised of an upstream portion 37a having an upstream end opened into the end face of the body portion 14 adjacent the air cleaner 13 and a downstream end opened into the side surface of the body portion 14, and a downstream portion 37b having an upstream end opened into the side surface of the body portion 14 in the vicinity of an opening at the downstream end of the upstream portion 37a and a downstream end communicating with the first groove 27. The idle adjusting valve 38 is a solenoid valve and is mounted to the side surface of the body portion 14 to control the amount of air flowing between the downstream end of the upstream portion 37a and the upstream end of the downstream portion 37b in the second air supply passage 37. The idle adjusting valve 38 is intended to control the number of revolutions of the internal combustion engine by controlling the amount of air bypassing the throttle valves 21 during an idle operation of the internal combustion engine Moreover, the casting of the body portion 14 can be facilitated, and it is possible to form the upstream and downstream portions 37a and 37b of the second air supply passage 37 into a simple configuration. Because of such structure, the side surface of the body portion 14 into which the upstream and downstream portions 37a and 37b of the second air supply passage 37 are opened is flat, and the idle adjusting valve 38 is mounted to such flat side surface. Additionally, idle adjusting valve 38 is kept warmed by engine-cooling water for the purpose of preventing icing and enabling warming of body portion 14.

Ports $39_1$, $39_2$ and $39_3$, FIG. 3, are provided in the body portion 14 and opened into the intake paths $15_1$, $15_2$ and $15_3$ in an opposed relation to the first ports $25_1$, $25_2$ and $25_3$, respectively, in a plane in the intake direction 16, including rotational axes of the throttle valves 21, between the throttle valves 21 and the coupled surface 17a of the flange potion 17. Each of the ports $39_1$, $39_2$ and $39_3$ is formed at a small diameter to function as a constriction. A second groove 40 is provided in the coupled surface 17a of the body portion 14 and occluded by the gasket 28 during coupling to the intake manifold 7 to define a second communication passage 43. Ports $39_1$, $39_2$ and $39_3$ are commonly connected to the second groove 40 and, thus, the second communication passage 43. Moreover, second groove 40 is defined in coupled surface 17a above second ports $39_1$, $39_2$ and $39_3$. A connecting pipe 41 is connected to the second communication passage 43, and an intake pressure detector 42 is connected to the connecting pipe 41.

The operation of this embodiment will be described below. The three throttle valves 21 are commonly secured to valve stem 20 and are opened and closed synchronously in response to the rotating operation of the valve stem 20. Because they are commonly secured to the valve stem 20, but it is possible that there may be some variation in idle opening degree of the throttle valves 21 so operated synchronously. However, the first communication passage 26 leads to the intake paths $15_1$, $15_2$ and $15_3$ downstream of the throttle valves 21 in the intake direction 16 and is connected to the air cleaner 31 through the first air supply passage 29 having the adjusting screw 31, so that air is introduced from the air cleaner 13 through the first air supply passage 29 and the first communication passage 26 in response to a negative pressure downstream of the throttle valves 21. Therefore, variation in idle opening degree of the throttle valves 21 is compensated to eliminate variation in idle intake amount of air into each cylinder C. Moreover, a correction amount of air into each of the intake paths $15_1$, $15_2$ and $15_3$ can be adjusted by the adjusting screw 31 provided in the first air supply passage 29 and therefore, the need for the adjustment for each of the intake paths $15_1$, $15_2$ and $15_3$ is eliminated.

Further, in the same way as by the first air supply passage 29 and the adjusting screw 31, variation in idle intake amount of air into each cylinder C can be, of course, prevented even by the second air supply passage 37 leading to the first communication passage 26 and by the idle adjusting valve 38 provided in the second air supply passage 37.

In addition, the throttle body 12 is directly coupled to the air cleaner 13 and, hence, as compared with the prior art system including a surge tank interposed between each intake passage and an air cleaner, it is possible to increase the space efficiency by providing the air cleaner 13 functioning as a serge tank. Moreover, it is possible to dispose the throttle valves 21 in the corresponding intake passages W as upstream as possible in the intake direction 16. When the load of the engine is increased, to provide an increased intake amount of air, the upstream end of each throttle valve 21, in the intake direction 16, is located at least on corresponding one of the funnel-shaped portions $19_1$, $19_2$ and $19_3$, ensuring that the intake resistance, due to each throttle valve 21, can be suppressed to a minimum extent, leading to an increase in output from the engine. Furthermore, since the first and second ports $25_1$, $25_2$, $25_3$, $39_1$, $39_2$ and $39_3$ are disposed between the Coupled surface 17a of the body portion 14 of the throttle body 12 to the intake manifold 7 and the throttle valves 21, their disposition is possible with an avoidance of a reduction in intake inertia effect in the intake passages W.

The first and second communication passages 26 and 43 are defined by the gasket 28 and the first and second grooves 27 and 40 provided in the coupled surface 17a, respectively, and are easy to machine, ensuring that a reduction in number of parts or components can be provided, as compared with a system in which the first ports $25_1$, $25_2$ and $25_3$ and the second ports $39_1$, $39_2$ and $39_3$ are connected through pipes.

Since the second communication passage 43, with the intake pressure detector 42 connected thereto, communicates with the intake passages W, through the second ports $39_1$, $39_2$ and $39_3$, each formed at a small diameter to function as a constriction and each opened into the corresponding intake passage W at a location as upstream as possible, it is possible to avoid influence exerted between the individual intake passages W, and to detect the intake pressure of air accurately and stably with influence, due to a variation in pressure in each cylinder C, being reduced.

Further, since the first ports $25_1$, $25_2$ and $25_3$ and the second ports $39_1$, $39_2$ and $39_3$ are opened into the intake passages w in opposed locations in a plane in the intake direction 16, including the rotational axes of the throttle valves 21, the distance between the first and second ports is relatively large and therefore, it is avoided that the first ports $25_1$, $25_2$ and $25_3$ and the second ports $39_1$, $39_2$ and $39_3$ exert an influence to each other and are made difficult to be subjected to an influence due to a variation in opening degree of the throttle valves 21. Additionally, the first and second communication passages 26 and 43 are located above the first and second ports $25_1$, $25_2$, $25_3$, $39_1$, $39_2$ and $39_3$. Even if water or oil enters both the communication passages 26 and 43, the water or oil can be reliably discharged through the first and second ports $25_1$, $25_2$, $25_3$, $39_1$, $39_2$ and $39_3$ into the intake passages W and prevented from being accumulated in both the passages 26 and 43, thereby reliably achieving the function of the communication passages 26 and 43.

Although the present invention has been applied to the three-cylinder type internal combustion engine in the above embodiment, it will be understood that the present invention is applicable in a wider range in association with two or more cylinder type internal combustion engines.

What is claimed is:

1. An intake system in a multi-cylinder type internal combustion engine, comprising a plurality of intake passages independently leading to cylinders in an engine body and commonly connected to an air cleaner, throttle valves independently disposed in the intake passages, and fuel injection valves independently disposed in the intake passages at positions downstream of the throttle valves in an intake direction in correspondence to the cylinders, wherein each of said intake passages comprises an intake manifold connected to the engine body and a throttle body having opposite ends directly connected to the intake manifold and the air cleaner, respectively, said throttle body including a plurality of funnel-shaped portions provided therein and spread toward an upstream side to define upstream ends of the intake passages, and each of said throttle valves is disposed in the throttle body, so that an upstream end of the throttle valve, in the intake direction, is located at least on the corresponding funnel-shaped portion when said throttle valve is fully opened, said throttle body having ports which are opened into the intake passages between a coupled surface of the throttle body to the intake manifold and the throttle valves, respectively, and which communicate with one another.

2. An intake system in a multi-cylinder type internal combustion engine according to claim 1, wherein said engine body is disposed so that axes of the cylinders, inclined to one direction from a vertical direction, and said intake manifold, said throttle body and said air cleaner are disposed above said engine body.

3. An intake system in a multi-cylinder type internal combustion engine according to claim 1, wherein each of said ports has a constriction provided therein, said ports being commonly connected to an intake pressure detector.

4. An intake system in a multi-cylinder type internal combustion engine according to claim 1, wherein said ports are provided in a pair for each of said intake passages, each pair of the ports being disposed in an opposed relation to each other in a plane in the intake direction, including the rotational axes of said throttle valves.

5. An intake system in a multi-cylinder type internal combustion engine according to claim further including communication passages with which said ports commonly communicate, said communication passages being disposed above said ports.

6. An intake system in a multi-cylinder type internal combustion engine according to claim 5, further including a control valve provided in an upstream portion of said port and mounted to the throttle body for controlling an amount of air flow.

7. An intake system in a multi-cylinder type internal combustion engine according to claim 1, further including a control valve provided in an upstream portion of said port and mounted to the throttle body for controlling an amount of air flow.

8. An intake system in a multi-cylinder type internal combustion engine, comprising a plurality of intake passages independently leading to cylinders in an engine body and commonly connected to an air cleaner, throttle valves independently disposed in the intake passages, and fuel injection valves independently disposed in the intake passages at positions downstream of the throttle valves in an intake direction in correspondence to the cylinders, wherein each of said intake passages comprises an intake manifold connected to the engine body and a throttle body having opposite ends directly connected to the intake manifold and the air cleaner, respectively, said throttle body including constrictions provided therein and opened into the intake passages between a coupled surface of the throttle body to the intake manifold and the throttle valves, respectively, said constrictions being commonly connected to an intake pressure detector.

9. An intake system in a multi-cylinder type internal combustion engine according to claim 8, wherein said engine body is disposed so that axes of the cylinders are inclined from a vertical direction to one direction, and said intake manifold, said throttle body and said air cleaner are disposed above said engine body.

10. An intake system in a multi-cylinder type internal combustion engine, comprising a plurality of intake passages independently leading to cylinders in an engine body and commonly connected to an air cleaner, throttle valves independently disposed in the intake passages and fuel injection valves also independently disposed in the intake passages at positions downstream of the throttle valves in an intake direction in correspondence to the cylinders, wherein each of said intake passages comprises an intake manifold connected to the engine body and a throttle body having opposite ends directly connected to the intake manifold and the air cleaner, respectively, said throttle body including first and second ports provided therein and opposed to each other in a plane in the intake direction, including rotational axes of the throttle valves, so that they are opened into the intake passages between a coupled surface of the throttle body to the intake manifold and the throttle valves, and said intake system further includes a first communication passage commonly communicating with the first ports, and a second communication passage commonly communicating with the second port, said first and second communication passages being disposed above said first and second ports, respectively.

11. An intake system in a multi-cylinder type internal combustion engine according to claim 10, wherein said engine body is disposed so that axes of the cylinders are inclined to one direction from a vertical direction, and said intake manifold, said throttle body and said air cleaner are disposed above said engine body.

12. An intake system in a multi-cylinder type internal combustion engine according to claim 10, further including a control valve provided in an upstream portion of said first or second port and mounted to the throttle body for controlling an amount of air flow.

* * * * *